(12) United States Patent
Hosein et al.

(10) Patent No.: US 9,078,225 B2
(45) Date of Patent: Jul. 7, 2015

(54) DYNAMIC MOBILE POWER HEADROOM THRESHOLD FOR DETERMINING RATE INCREASES IN THE REVERSE TRAFFIC CHANNEL OF A CDMA NETWORK

(75) Inventors: Patrick Hosein, San Diego, CA (US); Tao Wu, Carlsbad, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 3788 days.

(21) Appl. No.: 10/723,805

(22) Filed: Nov. 26, 2003

(65) Prior Publication Data
US 2004/0252658 A1    Dec. 16, 2004

Related U.S. Application Data

(60) Provisional application No. 60/501,663, filed on Sep. 9, 2003, provisional application No. 60/478,798, filed on Jun. 16, 2003, provisional application No. 60/479,013, filed on Jun. 17, 2003.

(51) Int. Cl.
| | |
|---|---|
| *H04W 4/00* | (2009.01) |
| *H04W 52/36* | (2009.01) |
| *H04W 52/04* | (2009.01) |
| *H04W 52/34* | (2009.01) |

(52) U.S. Cl.
CPC ............ *H04W 52/367* (2013.01); *H04W 52/04* (2013.01); *H04W 52/343* (2013.01); *H04W 52/365* (2013.01)

(58) Field of Classification Search
USPC ................... 370/328, 318, 342, 229; 455/522
See application file for complete search history.

(56) References Cited

U.S. PATENT DOCUMENTS

| | | | | |
|---|---|---|---|---|
| 5,859,838 | A * | 1/1999 | Soliman ......................... | 370/249 |
| 6,397,070 | B1 * | 5/2002 | Black ............................ | 455/453 |
| 2001/0017848 | A1 * | 8/2001 | Tiedemann, Jr. .............. | 370/318 |
| 2002/0110101 | A1 * | 8/2002 | Gopalakrishnan et al. ... | 370/335 |
| 2003/0133409 | A1 * | 7/2003 | Corazza ........................ | 370/230 |
| 2003/0142768 | A1 * | 7/2003 | Sintonen ........................ | 375/345 |
| 2003/0179704 | A1 * | 9/2003 | Lakkakorpi ................... | 370/230 |
| 2004/0029604 | A1 * | 2/2004 | Raaf ............................. | 455/522 |
| 2004/0223455 | A1 * | 11/2004 | Fong et al. .................... | 370/229 |

\* cited by examiner

*Primary Examiner* — Justin Lee
(74) *Attorney, Agent, or Firm* — Coats & Bennett, PLLC

(57) ABSTRACT

Closed loop and open loop control mechanisms are disclosed for adjusting the power headroom in a mobile station. The closed loop control comprises receiving a load indication from a base station indicative of the reverse link load, and adjusting the power headroom of the mobile station based on the load indication. The open loop control mechanism comprises counting the number of times that the mobile station is power limited, and adjusting the power headroom threshold based on the count.

21 Claims, 7 Drawing Sheets

DYNAMIC MOBILE POWER HEADROOM THRESHOLD FOR DETERMINING RATE INCREASES IN THE REVERSE TRAFFIC CHANNEL OF A CDMA NETWORK

RELATED APPLICATIONS

This application claims priority under 35 U.S.C. §119 (e) from the following provisional applications: Application Ser. No. 60/501,663 filed on Sep. 9, 2003. Application Ser. No. 60/478,798 filed on Jun. 16, 2003, and Application Ser. No. 60/479,013 filed on Jun. 17, 2003. The 60/501,663 Provisional application is incorporated in its entirety by reference herein.

BACKGROUND OF THE INVENTION

The ultimate purpose of a communication system is to transmit information from an information source to a destination over a communication channel. In wireless communication systems, noise and multipath fading cause bit errors to occur during transmission. A variety of error control techniques are used to combat interference and reduce bit errors. Most error control techniques introduce controlled redundancy into the information transmitted over the communication channel that can be used at the destination to detect and possibly correct bit errors that may occur during transmission. Two commonly used error control techniques are automatic repeat request (ARQ) and forward error correction (FEC).

The basic principle underlying ARQ is to add redundant bits or check bits to a message that allows detection of errors at the receiver. If the receiver detects errors in the received message, the receiver can request a repeat transmission of the message, either by sending an explicit request for retransmission or by not acknowledging receipt of the message. Retransmissions are typically at the same data transmission rate as the original transmission. The number of retransmissions may be limited to a predetermined maximum number. ARQ is simple and achieves reasonable throughput when the error rate is low. Throughput diminishes, however, as the error rate increases because of the need to resend data.

FEC uses error-correcting codes to combat errors by adding redundancy to information before it is transmitted enabling the receiver to detect and correct most errors that occur during transmission. A receiver with knowledge of the error correcting code can detect and correct most bit errors. Examples of FEC codes include block codes, convolutional codes, and turbo codes.

Hybrid ARQ (HARQ) is another error control technique that combines ARQ and FEC. HARQ is generally adopted for high-speed packet data (HSPD) channels to further ensure robustness against link adaptation errors. Using HARQ, messages are coded twice using an inner code and an outer code. The outer code may, for example, comprise a CRC code that is appended to the information bits prior to transmission to form a protected message. The protected message is then coded using FEC, for example, a convolutional code or turbo code. Both the information bits and CRC bits are coded. The coded message is then transmitted to a receiving terminal, which decodes the message and performs a CRC check. If the number of errors in the message is within the capabilities of the error correction code, the errors will be corrected without the need for retransmission. Only if the number of errors in the message exceeds the capabilities of the error correcting code will retransmission be requested.

When ARQ and HARQ are employed on a reverse link channel, the mobile station needs to take into account the possibility that the original frame may need to be retransmitted at the same rate if the original transmission fails. Thus, the mobile station will normally reserve some power, so that it will be able to maintain its current data transmission rate even if channel conditions worsen. The reserved power is generally referred to as power headroom. If the power headroom is too small and conditions significantly worsen, the mobile station may not be able to retransmit bad frames as required by the ARQ and HARQ. On the other hand, if too much power is reserved, the average data transmission rate of the mobile station will be reduced.

SUMMARY OF THE INVENTION

The present invention relates to a method for dynamically adjusting the power headroom threshold in a mobile station implementing automatic repeat request (ARQ) or hybrid ARQ (HARQ). The mobile station reserves some power in case retransmission of a frame requires more power than the original transmission. Typically, the retransmitted frame must be transmitted at the same or a higher rate than the original transmission. Therefore, the mobile station normally operates at a power level below a power headroom threshold. The mobile station dynamically adjusts the power headroom threshold, depending on the reverse link load. If the reverse link load increases, the mobile station decreases the power headroom threshold to provide more power headroom. Conversely, if the reverse link load decreases, the mobile station increases the power headroom threshold to reduce the power headroom.

In one exemplary embodiment, the mobile station receives load indications indicative of the reverse link load from the base station. The base station may send load indications to the mobile stations in an upper layer message or, alternatively, may transmit a periodic load indication to the mobile stations over a common control channel. The periodic load indications may also be used for common rate control by the mobile stations.

In one embodiment of the invention, the mobile station may maintain a counter to count the number of times that the mobile station is power limited for a retransmission. Upon expiration of the timer, the mobile station may adjust the power headroom threshold upward or downward based on the count. The adjustment of the power headroom threshold based on the count may be used as an open loop control mechanism.

DETAILED DESCRIPTION OF THE INVENTION

Figure 1:
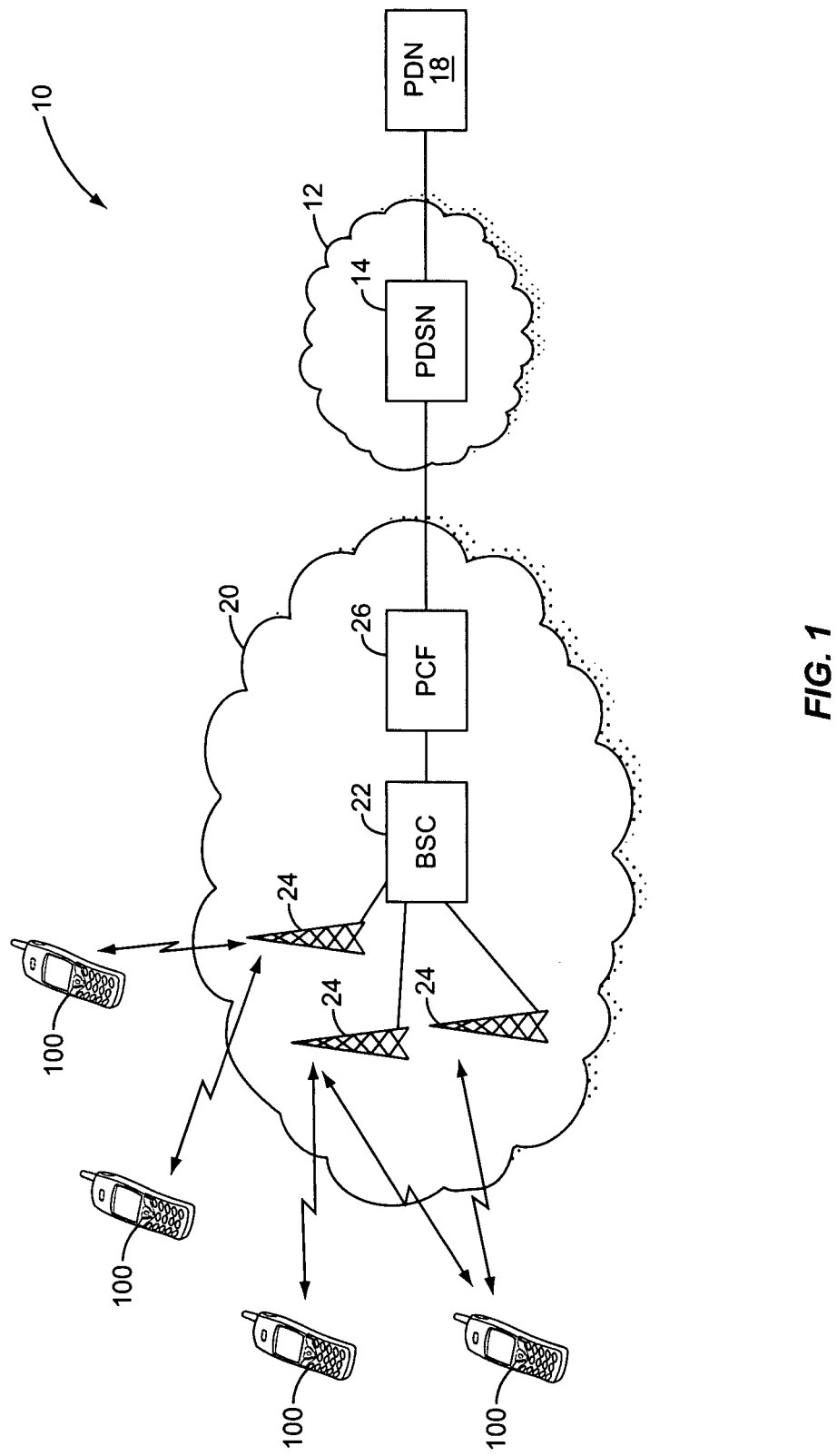
FIG. 1 is a diagram of a wireless communication network.

Referring now to FIG. 1, the present invention will be discussed in the context of a wireless communications network 10. The present invention was originally developed for use in code division multiple access (CDMA) networks and therefore the discussion will focus on CDMA networks 10 based on the cdma2000 standard. The present invention is particularly useful in systems based on the first EVolution (1xEV) of the cdma2000 standard, which includes both the 1xEV-DO (Data Only) and 1xEV-DV (Data and Voice) standards. However, the present invention could be adapted and employed in systems using other communication standards.

Network 10 comprises a packet-switched core network 12 including at least one packet data serving node (PDSN) 14 and one or more radio access networks (RANs) 20 operatively connected to the core network 12. Each RAN 20 comprises at least one packet control function (PCF) 26, one or more base station controllers (BSCs) 22, and one or more RBSs 24.

Each RBS 24 comprises a plurality of transmitters and receivers and can simultaneously handle calls from many mobile stations 100. Each RBS 24 is located in and provides service to a geographic region referred to as a cell. In general there is one RBS 24 in a cell, but a cell could include multiple RBSs 24. The cell may be a sectorized cell that is divided into a number of sectors. A single RBS 24 may serve all sectors in a cell.

The BSC 22 manages the communication resources for a plurality of RBSs 24 and coordinates the operations of multiple RBSs 24. The PCF 26 connects to the BSC 22 to the PDSN 14 in the core network 12. PCF 26 routes calls and signaling messages between the PDSN 14 and the RBSs 24 via the BSC 22. The PDSN 14 connects to external Packet Data Networks (PDN) 18, such as the Internet. PDSN 14 routes data, via the BSC 22 and RBS 24, to individual mobile stations 100.

Figure 2:
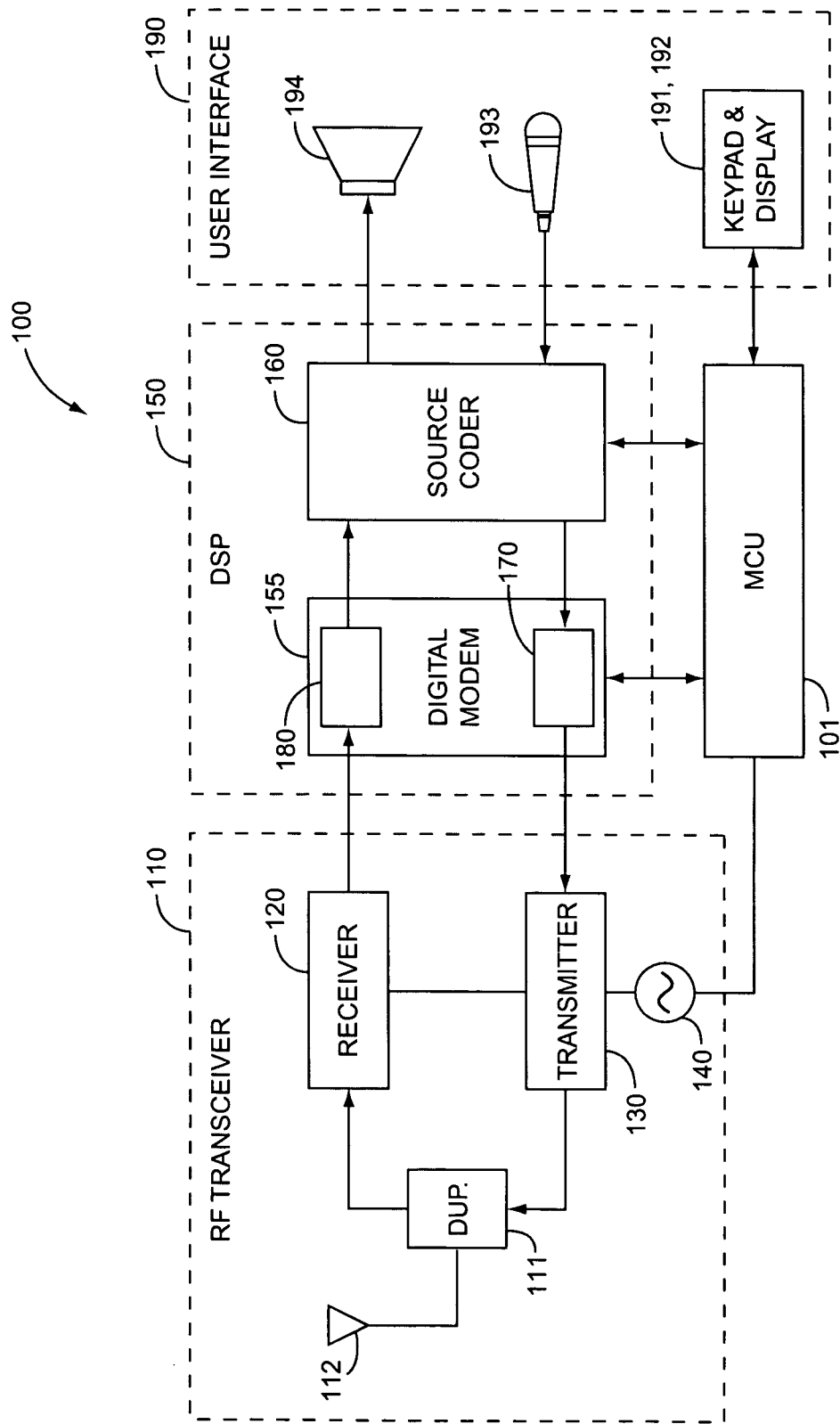
FIG. 2 is a functional block diagram of a mobile station according to the present invention.

FIG. 2 is a block diagram of a mobile terminal 100. The term mobile terminal 100 as used herein includes a cellular radiotelephone; a Personal Digital Assistant (PDA) that may combine a cellular radiotelephone with data processing, facsimile and data communications capabilities; a conventional laptop and/or palmtop computer equipped with a radiotelephone transceiver, or other appliance that includes a radiotelephone transceiver. Mobile terminals 100 may also be referred to as "pervasive computing" devices.

Mobile terminal 100 is a fully functional mobile radio transceiver capable of transmitting and receiving signals over a RF channel. Exemplary standards that may be implemented by the mobile terminal 100 include, but are not limited to, cdma2000 and WCDMA. Mobile terminal 100 comprises a microcontroller unit (MCU) 101, a RF transceiver 110, a digital signal processor (DSP) 150, and a user interface 190. Mobile terminal 100 may additionally include an external interface for communication with a computer, local area network, or other device.

RF transceiver 110 establishes a link for wireless communications with the base station 12. RF transceiver 110 comprises a receiver 120, transmitter 130, frequency synthesizer 140, duplexer or switch 111, and antenna 112. Receiver 120 receives downlink or forward link communications from the base station 12. Receiver 120 amplifies and downconverts received signals to a baseband frequency for processing by the DSP 150. Transmitter 130 sends uplink or reverse link communications to the base station 12. Transmitter 130 receives baseband signals from the DSP 150, which the transmitter 130 amplifies and uses to modulate a RF carrier at a directed power level. Frequency synthesizer 140 provides the reference signals used for frequency translation in the receiver 120 and transmitter 130. Receiver 120 and transmitter 130 are coupled to antenna 112 by duplexer or switch 111. Duplexer 111 includes a duplex filter to isolate the transmitter 130 from the receiver 120. The duplex filter combines a transmit-band filter and receiver-band filter to provide the necessary isolation between the two paths.

DSP 150 comprises a digital modem 155 and a source coder 160. Source coder 160 includes a speech coder (not shown) for digitizing and coding speech for transmission on the reverse link to the base station 12. Additionally, the speech coder decodes speech signals received from the base station 12 and converts speech signals into audio signals that are output to speaker 194. Speech is typically encoded at rates of 9.6 kilobits per second or 13.3 kilobits per second. The details of speech coding are not material to the invention and, therefore, are not explained in detail herein.

The digital modem 155 processes digital signals to make communication over the propagation channel more robust. Digital modem 155 includes a digital modulator 170 and at least one demodulator 180. The digital modulator 170 superimposes the message waveform onto a carrier for radio transmission using techniques that guard against fading and other impairments of the radio channel while attempting to maximize bandwidth efficiency. Modulator 170 may also perform channel coding and encryption if used. The digital demodulator 180 detects and recovers the transmitted message. It tracks the received signal, estimates received signal strengths, rejects interference, and extracts the message data from noisy signals. Demodulator 180 also performs synchronization, channel decoding, and decryption if used.

The MCU 101 supervises the operation of the mobile terminal 100 and administers the procedures associated with the applicable communication protocol. The MCU 101 implements the communication protocols used by the mobile terminal 100. The communication protocol specifies timing, multiple access approach, modulation format, frame structure, power level, as well as many other aspects of mobile terminal operation. The MCU 101 inserts signaling messages into the transmitted signals and extracts signaling messages from the received signals. MCU 101 acts on signaling messages received from the base station 12 as set forth in the communication protocol. When the user enters commands via the user interface 190, the commands are passed to the MCU 101 for action.

A plurality of mobile stations 100 communicate with the RBS 24 over a reverse link channel. RBS 24 controls the data transmission rate of the mobile stations 100 transmitting on the reverse link channel to maintain the reverse link load at a desired level. The RBS 24 described herein uses common rate control (CRC) to control the data transmission rates of the mobile stations 100, but other rate control schemes, such as dedicated rate control and scheduling could also be employed.

With common rate control, all mobile stations 100 that need to transmit data in the reverse link are allowed to do so. Each mobile station 100 initially begins transmitting at a specified minimum rate (sometimes called the autonomous rate) and then, depending on load at the RBSs 24 in its active set, is allowed to vary its transmission rate. The RBS 24 periodically (e.g., once per frame) estimates the reverse link load and broadcasts a quantized load indication to mobile stations 100 transmitting on the reverse link channel. The mobile stations 100 adjust their transmit rates based at least in part on the load indications from the RBS 24. Rate adjustment decisions by the mobile stations 100 will tend to follow the load indications from the RBS 24. If the reverse link load at the RBS 24 increases above a maximum or a target load, the mobile stations 100 in general will decrease their transmission rate to reduce the reverse link load. Conversely, if the reverse link load at the RBS 24 decreases below a minimum load or the target load, the mobile stations 100 in general will increase their transmission rate to increase the load and more efficiently use the reverse link channel. The rate adjustment decision of an individual mobile station 100, however, may not follow the load indication at a given time instant since other factors (e.g., user class, QoS information, power limitations, etc.) may be evaluated in making rate control decisions. As discussed below, one such factor is the power headroom.

Figure 3:
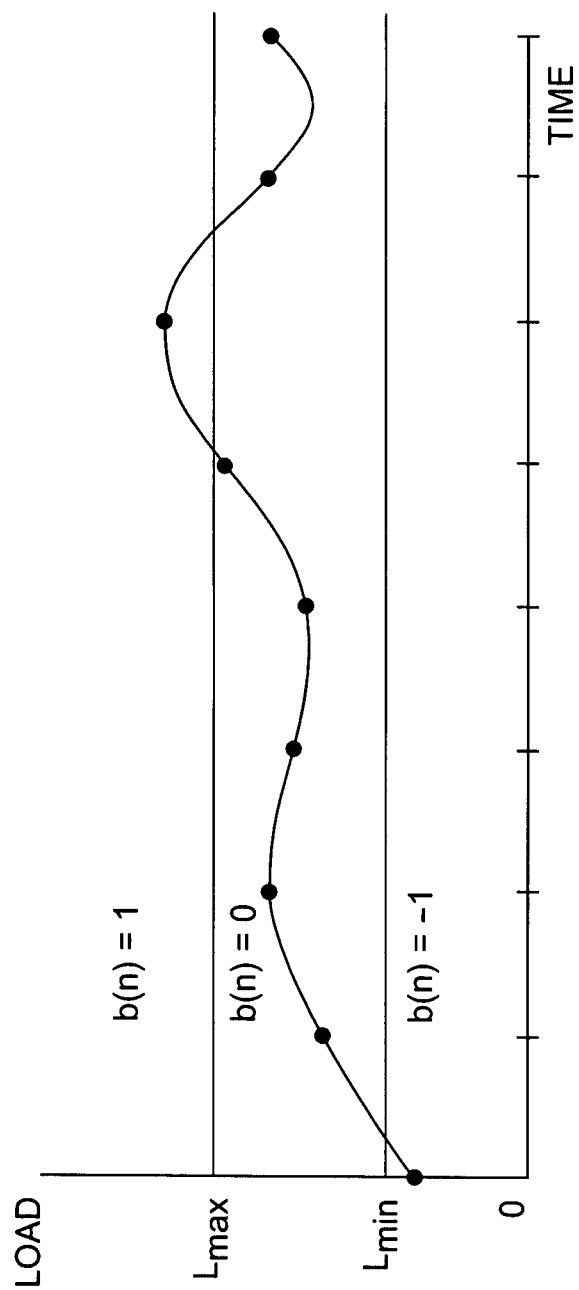
FIG. 3 illustrates an exemplary load curve for a reverse link communication channel.

FIG. 3 is an exemplary graph illustrating reverse link load in a CDMA network 10 implementing common rate control. In FIG. 3, the vertical axis represents the reverse link load, and the horizontal axis represents time. $L_{MAX}$ is the maximum load beyond which the system is unstable and outages are likely to occur. $L_{MIN}$ is the load below which the system is considered lightly loaded. During operation the RBS 24 periodically estimates the reverse link load and determines the load indication to broadcast to the mobile stations 100 transmitting on the reverse link. The evaluation period may be once per frame. Evaluation periods longer or shorter than once per frame are also within the scope of the invention. If L(n) denotes the estimate of the reverse link load at the nth evaluation period, and b(n), the RBS 24 may determine the corresponding load indication as follows:

$$\text{if} \quad (L(n) >= L_{MAX}) \quad \{\text{set } b(n) = 1\} \quad \text{Eq. 1}$$
$$\text{else if} \quad (L(n) <= L_{MIN}) \quad \{\text{set } b(n) = -1\}$$
$$\text{else} \quad \{\text{set } b(n) = 0\}$$

The load indication b(n) may comprise, for example, one or more reverse activity bits (RABs) that are transmitted to the mobile stations 100 during each evaluation period as specified in current standards. The load indication b(n) may be transmitted over a common control channel.

The mobile stations 100 receive the load indications b(n) from the RBS 24 and decide whether to change their data transmission rate for the next transmission. In a simple embodiment, the mobile station 100 may increase the data transmission rate for the next transmission when it receives a "1," decrease the data transmission rate for the next transmission when it receives a "−1" and hold its current data transmission rate when it receives a "0." In other embodiments, the mobile station 100 may filter the load indications from the base stations to generate a load tracking value and probabilistically change its data transmission rate based on the load tracking value. The load indications b(n) may be filtered according to:

$$y(n) = ab(n) + (1-a)y(n-1), \quad \text{Eq. 2}$$

where y(n) is the load tracking value at period n, y(n−1) is the load tracking value at period n−1, and a is an smoothing factor. Eq. 1, in effect, computes a weighted average of the load indications b(n) from the RBS 24 over a plurality of evaluation periods. The value of a, which is in the range of 0 to 1, determines the weight given to the load indication for the current evaluation period. The load tracking value y(n) may be used to probabilistically change the data transmission rate of the mobile station 100.

Figure 4:
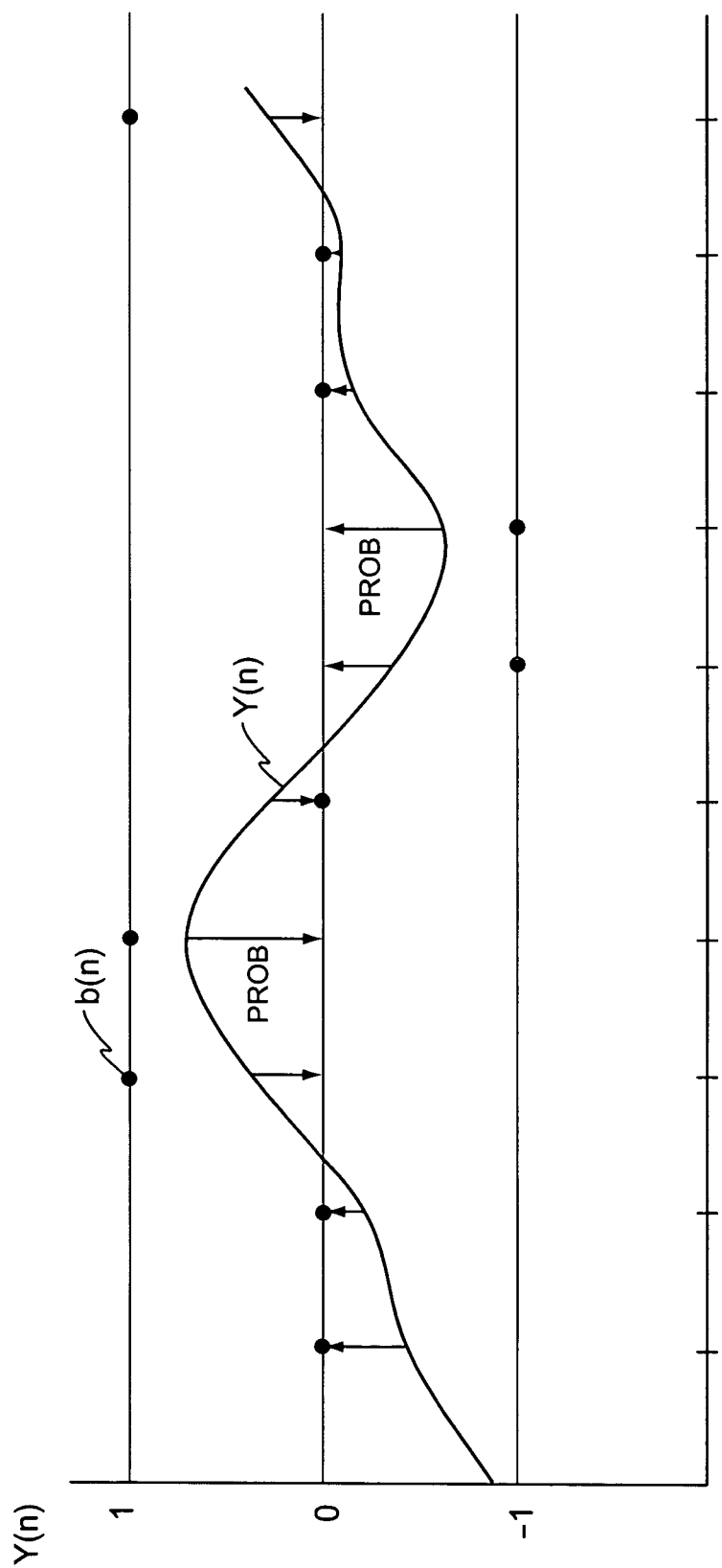
FIG. 4 illustrates an exemplary load tracking curve for a mobile station according to one embodiment of the present invention.

FIG. 4 illustrates an exemplary loading tracking curve in a mobile station 100. The dots represent the current load indication b(n) from the RBS 24. The curve represents the load tracking value. As shown in FIG. 4, the probability of a rate change is dependent on the distance of the load tracking value from a reference value. As the distance increases, so does the rate change probability. Techniques for probabilistically changing data transmission rate are described in two copending applications titled "Common Rate Control Method for Reverse Link Channels in CDMA Networks" filed on Nov. 21, 2003, and "Common Rate Control Method Based on Mobile Transmit Power" filed on Nov. 21, 2003. These applications are incorporated herein by reference.

As noted above, the load indication b(n) may not be the sole criterion for changing data transmission rate. Other factors may impact the decision to change data transmission rate. The mobile station 100 cannot increase its transmit rate if it is currently transmitting at maximum power, or decrease its data transmission rate if it is currently transmitting at the minimum rate allowed. Further, the data transmission rate should only be increased if the mobile station 100 has a sufficient amount of data in its buffer to fill the next frame. As will be described in more detail below, the mobile station must also have sufficient power headroom to increase its data transmission rate.

To make communications between the mobile stations 100 and the RBSs 24 more robust, the network 10 in the exemplary embodiment employs an automatic repeat request (ARQ), which for purposes of this application includes hybrid ARQ (HARQ) schemes that combine ARQ and with forward error correction (FEC). When a RBS 24 receives a frame from a mobile station 100 in error, it sends a negative acknowledgement (NACK) to the mobile station 100 provided that the maximum number of retransmissions has not been reached. Alternatively, the RBS 24 may acknowledge (ACK) good frames. In response to the NACK or the lack of an ACK, the mobile station 100 retransmits the erroneous frame, typically at the same data transmission rate as the original transmission. Alternatively, the mobile station 100 may increase the data transmission rate for the retransmission.

Figure 5:
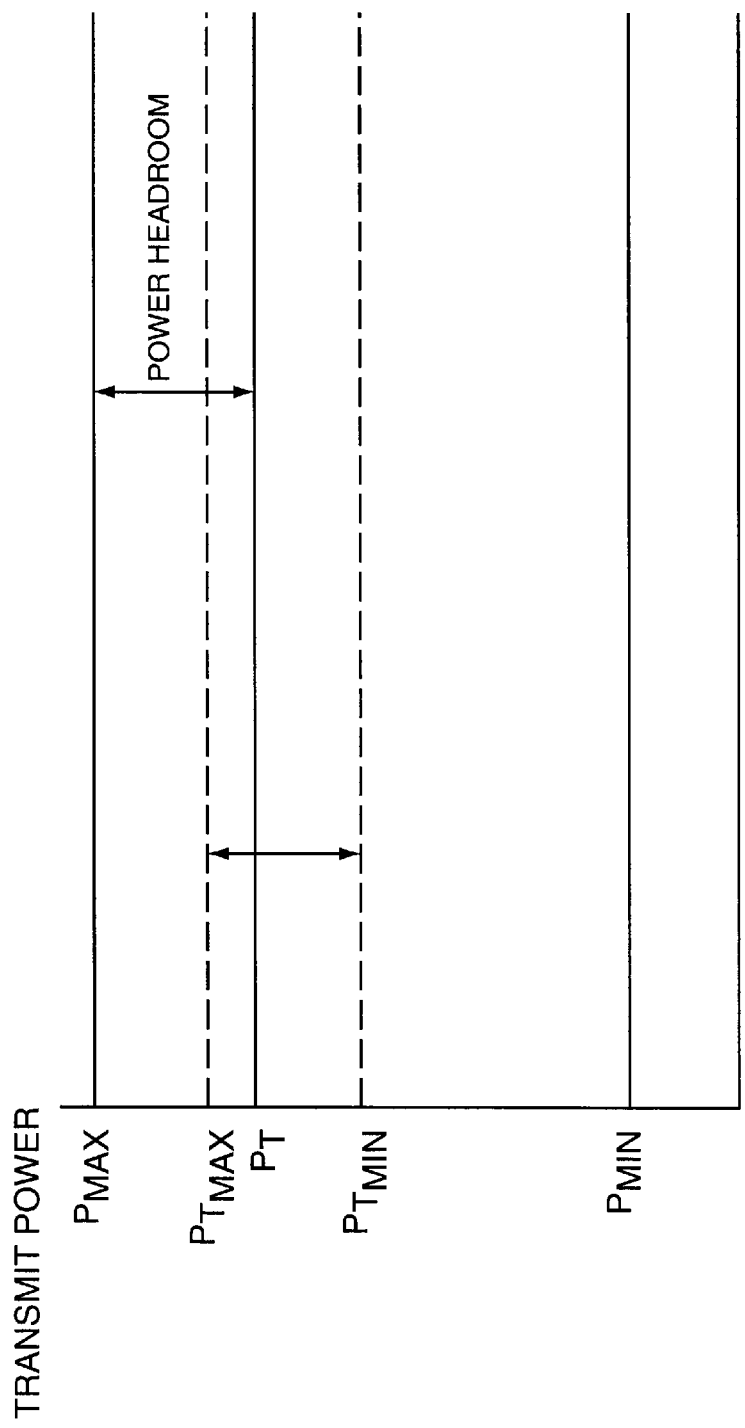
FIG. 5 illustrates the power headroom threshold for a mobile station according to the present invention.

When the mobile station 100 transmits a frame, it needs to take into account the possibility that the frame may need to be retransmitted at the same rate. Because of fading, the retransmission may require more power than the original transmission. Therefore, the mobile station 100 does not normally transmit at maximum power, but instead reserves some power in the event that more power is needed for a retransmission. The reserved power is generally referred to as power headroom and is illustrated in FIG. 5.

In many prior art networks 10, the amount of power headroom is fixed. The headroom is typically defined by a power headroom threshold $P_T$ (FIG. 5) that is offset from the maximum transmit power of the mobile station 100. When the power headroom is fixed, the power headroom threshold $P_T$ should be conservatively estimated to accommodate the largest anticipated swings in power requirements. If the power headroom threshold $P_T$ is too high, which implies a small power headroom, the mobile station 100 may not have sufficient power to retransmit an erroneous frame if the channel conditions worsen substantially. On the other hand, if the power headroom threshold $P_T$ is low, implying a large power headroom, the average data transmission rate will be reduced.

The size of the power headroom should preferably be determined based on the likelihood that the required power for a retransmission will increase. This probability depends on the present loading on the reserve link channel. If the reverse link channel is heavily loaded, the needed power changes more rapidly than when the reverse link channel is lightly loaded. According to the present invention, the power headroom of the mobile station 100 is dynamically adjusted depending on the reverse link load so that the power headroom is relatively large when the reverse link channel is heavily loaded, and is relatively small when the reverse link channel is lightly loaded. The RBS 24 reports the reverse link load to the mobile stations 100, which make appropriate adjustments to the power headroom threshold $P_T$ responsive to the reported load. The load reports from the RBS 24 may be included in an upper layer message that is broadcast to the mobile stations 100 over a common control channel. The load report could be broadcast periodically, but at a relatively low frequency, e.g. every 10 frames.

As noted in the previous discussion of CRC, the mobile station 100 may maintain a filtered estimate of the load indications b(n) from the RBS 24. In an alternate embodiment of the invention, the mobile station 100 filters the load indications b(n) to generate a load tracking value y(n), and uses the load tracking value y(n) to adjust the power headroom threshold $P_T$. In this embodiment, the adjustments to the power headroom threshold $P_T$ could be at the same frequency as the load indications, e.g. once per frame. The load tracking value y(n) may be computed according to Eq. 1, or some other smoothing function. The load tracking value y(n) may be used for CRC, but this is not required. The present invention may be used with other types of rate control including dedicated rate control and scheduling.

Figure 6:
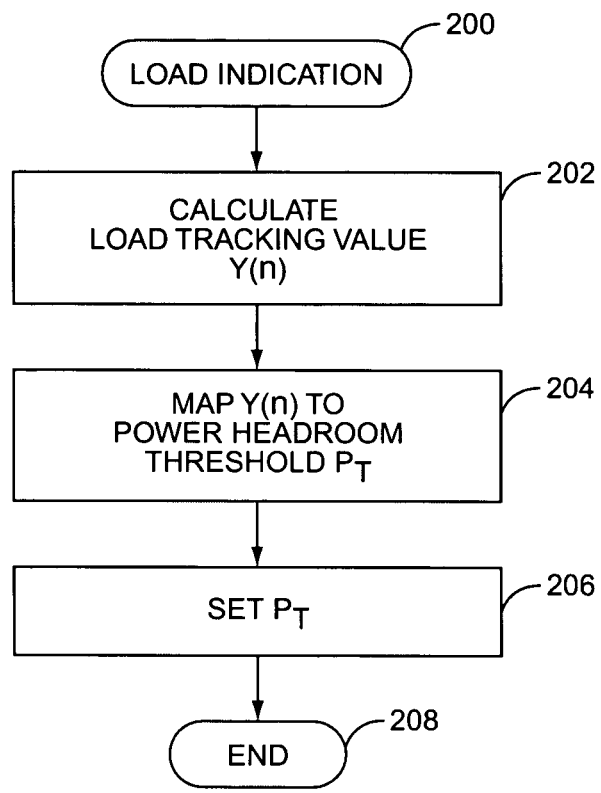
FIG. 6 illustrates an exemplary closed loop control procedure used by a mobile station to adjust the power headroom threshold.

FIG. 6 illustrates an exemplary procedure employed by a mobile station to adjust its power headroom threshold. In the exemplary embodiment, the power headroom adjustment procedure is executed each time a load indication b(n) is received from the RBS 24. Upon receiving the load indication (block 200), the mobile station 100 recalculates the load tracking value y(n) according to Eq. 1 or some other smoothing function (block 202). The mobile station 100 then maps the load tracking value y(n) to a corresponding power headroom threshold $P_T$ (block 204), sets the power headroom threshold $P_T$ (block 206), and the procedure ends (block 208).

The mapping may be according to a table stored in memory in the mobile stations 100, or may be performed by a mapping function. There may be a one-to-one correspondence between load tracking values y(n) and power headroom thresholds $P_T$. If the load indication y(n) for the mobile station 100 varies between $y(n)_{MAX}$ and $y(n)_{MIN}$, and the power headroom threshold varies between $P_{MAX}$ and $P_{MIN}$, the mapping function may be given by:

$$P_T = P_{MIN} + \beta((y(n)_{MAX} - y(n))) \qquad \text{Eq. 3}$$

where β is a scaling factor that scales the load tracking value y(n) to the power headroom threshold range. The scaling factor β is given by:

$$\beta = \frac{P_{MAX} - P_{MIN}}{y(n)_{MAX} - y(n)_{MIN}} \qquad \text{Eq. 4}$$

Eq. 3 maps the load tracking value y(n) linearly to a corresponding power headroom threshold $P_T$. The mobile station 100 may also use a non-linear mapping function to determine the power headroom threshold $P_T$ based on the load tracking value y(n).

In another embodiment of the invention, the mobile station 100 maintains a counter C and a timer T in memory to track the number of times that the mobile station 100 is power limited for a retransmission. That is, the counter C counts how many times retransmissions fail because the power required for the retransmission is greater than the mobile station's maximum transmit power $P_{MAX}$. At the expiration of the timer T, the mobile station 100 adjusts the power headroom threshold $P_T$ up or down depending on the count of retransmission failures. Adjustments may be by fixed amounts, which may be different for upward and downward adjustments. As the reverse link load is increasing, the number of retransmission failures will increase and the mobile station 100 will reduce the power headroom threshold $P_T$. Conversely, as the reverse link load decreases, the number of retransmission failures would be expected to decrease and the mobile station would increase the power headroom threshold $P_T$. The counter C may be used as an open loop control mechanism.

Figure 7:
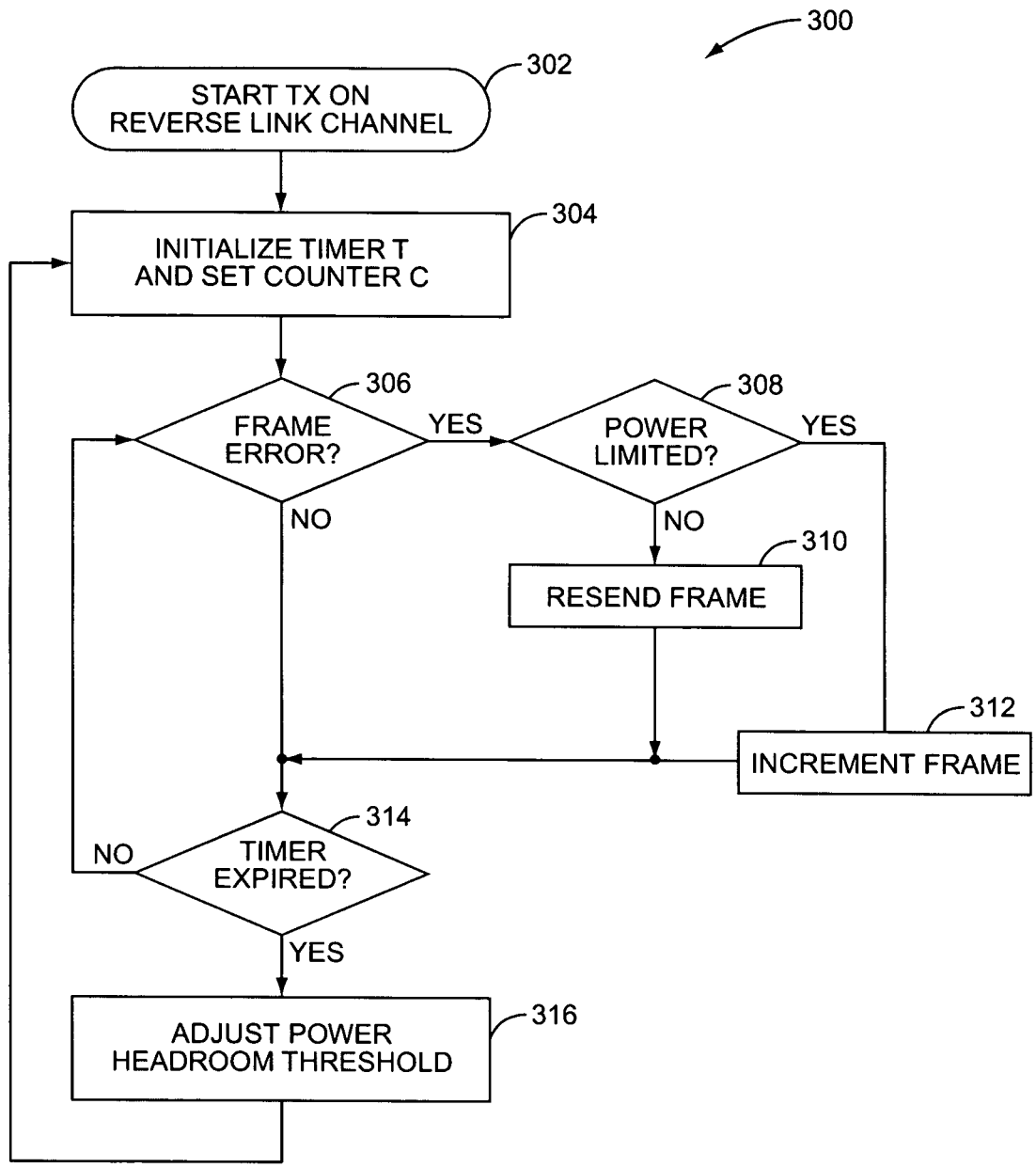
FIG. 7 illustrates an exemplary open loop control procedure used by a mobile station to adjust the power headroom threshold.

FIG. 7 illustrates an exemplary open loop power control procedure 300. The mobile station 100 starts transmitting data on the reverse traffic channel and sets its timer T (block 302). When the mobile station 100 begins transmitting, it initiates timer and sets the counter C to 0 (block 304). As the mobile station 100 transmits data, the RBS 24 may send a NACK, or fail to ACK, to indicate that a frame is received in error (block 306). The mobile station 100 determines if it has sufficient power to retransmit the frame (block 308) and if so, resends the frame (block 310), typically at the same data transmission rate as the original frame. If the mobile station 100 does not have sufficient power to retransmit the frame, it increments its counter C (block 312), and resumes transmission on the reverse link channel. When timer T expires (block 314), mobile station 100 adjusts the power headroom threshold based on the count C (block 316). After adjusting the power headroom threshold, the mobile station reinitializes the timer T and resets the counter C (block 304). This process continues while the mobile station 100 is transmitting on the reverse link channel and terminates when the mobile station 100 stops transmitting.

The power headroom threshold $P_T$ determined in accordance with any of the above described methods is used by the mobile station 100 to determine whether to increase the data transmission rate. The power headroom threshold $P_T$, in effect, acts as an external constraint on the rate control protocol. If the mobile station 100 is operating near the power headroom threshold $P_T$, the mobile station 100 may decide not to increase its transmit power even through it might otherwise do so in the absence of the power headroom threshold $P_T$. By making the power headroom threshold $P_T$ adjustable, the mobile station 100 can increase the power headroom threshold $P_T$ (reduce the power headroom) when the reverse link load is light and decrease the power headroom threshold $P_T$ (increase the power headroom) when the reverse link load is heavier. This dynamic adjustment of the power headroom threshold $P_T$ will increase the average data transmission rate of the mobile station 100 as compared to a fixed power headroom threshold.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method at a mobile station of adjusting a power headroom in the mobile station, comprising:
receiving a load indication from a base station indicative of a reverse link load;

determining an amount by which to adjust a power headroom threshold of the mobile station, based on said load indication, wherein said power headroom threshold defines the amount of transmit power reserved at the mobile station for making data retransmissions under Automatic Repeat reQuest (ARQ) control; and adjusting the power headroom threshold of the mobile station according to said determined amount.

2. The method of claim 1 wherein receiving a load indication from a base station comprises receiving the load indication in an upper layer message.

3. The method of claim 2 wherein the upper layer message is received over a common control channel.

4. The method of claim 1 wherein receiving a load indication from a base station comprises receiving a periodic load indication.

5. The method of claim 4 further comprising filtering the periodic load indications received over two or more periods to generate a filtered load estimate, and wherein said determining an amount by which to adjust the power headroom threshold comprises determining the amount by which to adjust the power headroom threshold as a function of the filtered load estimate.

6. The method of claim 4 further comprising calculating a load tracking value based on two or more periodic load indications, and wherein said determining an amount by which to adjust the power headroom threshold comprises determining the amount by which to adjust the power headroom threshold as a function of the load tracking value.

7. The method of claim 6 wherein calculating a load tracking value based on two or more periodic load indications comprises calculating a weighted average of two or more periodic load indications.

8. The method of claim 6 wherein calculating a load tracking value based on two or more periodic load indications comprises calculating a running average of two or more periodic load indications over a sliding time window.

9. The method of claim 6 wherein calculating a load tracking value based on two or more periodic load indications comprises evaluating a continuous load tracking function that converts discrete periodic load indications from the base station to a continuous load tracking value.

10. The method of claim 6 wherein said determining the amount by which to adjust the power headroom threshold as a function of the load tracking value comprises adjusting the power headroom threshold linearly based on changes in the load tracking value.

11. The method of claim 6 wherein said determining the amount by which to adjust the power headroom threshold as a function of the load tracking value comprises adjusting the power headroom threshold non-linearly based on changes in the load tracking value.

12. A mobile station comprising:

a receiver for receiving a load indication from a base station, said load indication indicative of a reverse link load;

a transmitter for transmitting signals to the base station at a variable data transmission rate dependent on the load indication; and a controller to determine an amount by which to adjust a power headroom threshold of the transmitter, based on said load indication, and to adjust the power headroom threshold according to said determined amount, wherein said power headroom threshold defines an amount of transmit power reserved for the transmitter for making data retransmissions under Automatic Repeat reQuest (ARQ) control.

13. The mobile station of claim 12 wherein the power headroom threshold limits the data transmission rate of the mobile station.

14. The mobile station of claim 12 wherein the load indication is received from the base station in an upper layer message.

15. The mobile station of claim 12 wherein the load indication is a periodic load indication.

16. The mobile station of claim 15 wherein the controller calculates a load tracking value based on two or more periodic load indications and wherein said determining an amount by which to adjust the power headroom threshold comprises determining the amount by which to adjust the power headroom threshold as a function of the load tracking value.

17. The mobile station of claim 16 wherein calculating a load tracking value based on two or more periodic load indications comprises calculating a weighted average of two or more periodic load indications.

18. The mobile station of claim 16 wherein calculating a load tracking value based on two or more periodic load indications comprises calculating a running average of two or more periodic load indications over a sliding time window.

19. The mobile station of claim 16 wherein calculating a load tracking value based on two or more periodic load indications comprises evaluating a continuous load tracking function that converts discrete periodic load indications from the base station to a continuous load tracking value.

20. The mobile station of claim 16 wherein the controller adjusts the power headroom threshold linearly based on changes in the load tracking value.

21. The mobile station of claim 16 wherein the controller adjusts the power headroom threshold non-linearly based on changes in the load tracking value.

* * * * *

UNITED STATES PATENT AND TRADEMARK OFFICE
CERTIFICATE OF CORRECTION

PATENT NO. : 9,078,225 B2  Page 1 of 1
APPLICATION NO. : 10/723805
DATED : July 7, 2015
INVENTOR(S) : Hosein et al.

It is certified that error appears in the above-identified patent and that said Letters Patent is hereby corrected as shown below:

Specification

In Column 5, Line 58, in Equation (2), delete "$y(n)=ab(n)+(1-a)y(n-1)$," and insert -- $y(n) = \alpha b(n) + (1 - \alpha)y(n - 1)$, --, therefor In Column 5, Line 60, delete "a" and insert -- $\alpha$ --, therefor.

In Column 5, Line 63, delete "a," and insert -- $\alpha$, --, therefor.

Signed and Sealed this
Twenty-fourth Day of November, 2015

Michelle K. Lee
*Director of the United States Patent and Trademark Office*